United States Patent [19]

Duncan

[11] 4,406,926

[45] Sep. 27, 1983

[54] TELEPHONE STATION CIRCUIT USING DIGITAL TONE GENERATION

[75] Inventor: Robert H. Duncan, Memphis, Tenn.

[73] Assignee: International Telephone and Telegraph Corporation, New York, N.Y.

[21] Appl. No.: 218,054

[22] Filed: Dec. 19, 1980

[51] Int. Cl.³ .............................................. H04M 1/26
[52] U.S. Cl. .............................. 179/84 VF; 179/90 K
[58] Field of Search ............... 179/84 VF, 90 K, 90 R

[56] References Cited

U.S. PATENT DOCUMENTS

| | | | |
|---|---|---|---|
| 3,525,819 | 8/1970 | Jackson | 179/90 R X |
| 3,814,865 | 6/1974 | Critchley et al. | 179/84 VF |
| 3,973,084 | 8/1976 | Hovland | 179/90 K |
| 4,061,886 | 12/1977 | Callahan, Jr. et al. | 179/84 VF |
| 4,087,638 | 5/1978 | Hayes et al. | 179/84 VF X |

FOREIGN PATENT DOCUMENTS 27302  4/1981  European Pat. Off. .......... 179/90 K

OTHER PUBLICATIONS

*Advanced Product Description S2859 Digital Tone Generator*, Jul. 1979, pp. 21-28; American Microsystems Inc.

Primary Examiner—A. D. Pellinen
Assistant Examiner—Keith E. George
Attorney, Agent, or Firm—James B. Raden; Marvin M. Chaban

[57] ABSTRACT

A telephone instrument station circuit using a digital tone generator for generating dual tone multifrequency (DTMF) signals. The circuit employs both series and shunt muting of the receiver during the intervals occurring during the depressive and release movements of the tone generating key or button of the keyblock. The receiver is doubly muted during these intervals to prevent inductively derived spikes from causing audible clicks in the receiver. During the period of tone generation on full depression of the button, the shunt muting is released to allow the full generated tone to be sent to the line, the series muting remaining in effect.

5 Claims, 1 Drawing Figure

TELEPHONE STATION CIRCUIT USING DIGITAL TONE GENERATION

BACKGROUND OF THE INVENTION

Dual tone multifrequency tone generators are well known as shown by U.S. Pat. No. 3,184,554 to L. Meacham et al issued May 18, 1965. In this patent, tones are generated by resonant circuits coupled electromagnetically to a transistor amplifier.

More recently, tone signals have been generated digitally and synthesized into the actual tones for transmission. For example, U.S. Pat. No. 3,787,836 issued Jan. 22, 1974 to Hagelbarger shows one circuit for generating tones for telephone signaling while U.S. Pat. No. 4,061,886 to Callahan et al. Dec. 6, 1977 shows another. The latter of these patents shows a method of muting the telephone instrument transmitter and receiver during the duration of the tone signals emitted by the generator. As a first step, as the transmitter is switched off, a muting series resistor bleeds the capacitive charge from the switch element to produce a sharp cutoff of the transmitter. A muting resistor is switched in series with the receiver to mute the receiver against transmitted dial tones.

Other commercial tone generators such as that sold by American Microsystems, Inc. under the Model No. S2859 provide muting logic to stagger the shut off periods of the receiver and transmitter and to produce tone output only when both receiver and transmitter are muted. In such a system, once the key button is depressed, the receiver is muted first to prevent clicks or other noises from reaching the ear of the instrument user. Thereafter, the transmitter is muted to minimize the possibility of false tones being sent. With both transmitter and receiver muted, the output tones are emitted. When the button is released, the tone output is terminated and the transmit mute is released. After a timed period sufficient to dissipate any inductive charge in the system, the receiver muting is released.

When such systems are used with inductive hybrids, it has been found that inductively induced clicks may be generated to the receiver especially after the release of the tone generating key. The series muting alone is not sufficient to switch off the noise current resulting in an audible unpleasant sound transmitted to the ear of a user of the instrument.

In some cases, shunt muting is provided, the muting continuing for the duration of button duration and tone generation. This form of muting acts to load the

SUMMARY OF THE INVENTION

In addition to the direct receiver and transmitter muting by series switching, the present invention provides a periodic shunting of the receiver during the periods of depressive and restorative movement of the tone generating button. This shunt muting during the staggered intervals acts to further enhance the series muting especially during the release interval of the tone generating key.

With the system shown, the first muting signal from the tone generator (preferably receiver muting) is received by an exclusive OR gate to charge a capacitor and to complete a shunt path around the receiver. In addition, a normally conductive series transistor is switched off to terminate any transient currents from the receiver. When the second muting output signal (transmitter muting) is sent by the tone generator, a normally conductive transmitter series transistor is switched off to open the path from the transmitter. The exclusive OR gate restores causing the discharge of the capacitor and turning off the shunting switch thereby slowly dissipating the capacitor charge and minimizing audio effects.

Both series muting output signals are maintained during the emission of generator output, to minimize the amplitude of signals transmitted to the receiver.

At the end of the output period, the transmit mute signal from the tone generator is terminated. The transmit series path is closed. The exclusive OR gate closes the path to the capacitor and again closes the receiver shunt path. The shunt path remains closed until after the receive mute signal is terminated at which time the exclusive OR gate opens causing the capacitor to discharge and slowly open the shunt path. This shunt path is maintained closed for an RC time period after the receiver series switch has opened. At the end of the time period, the receiver shunt switch is opened and the circuit is restored to its normal at rest condition.

DETAILED DESCRIPTION

Figure 1:
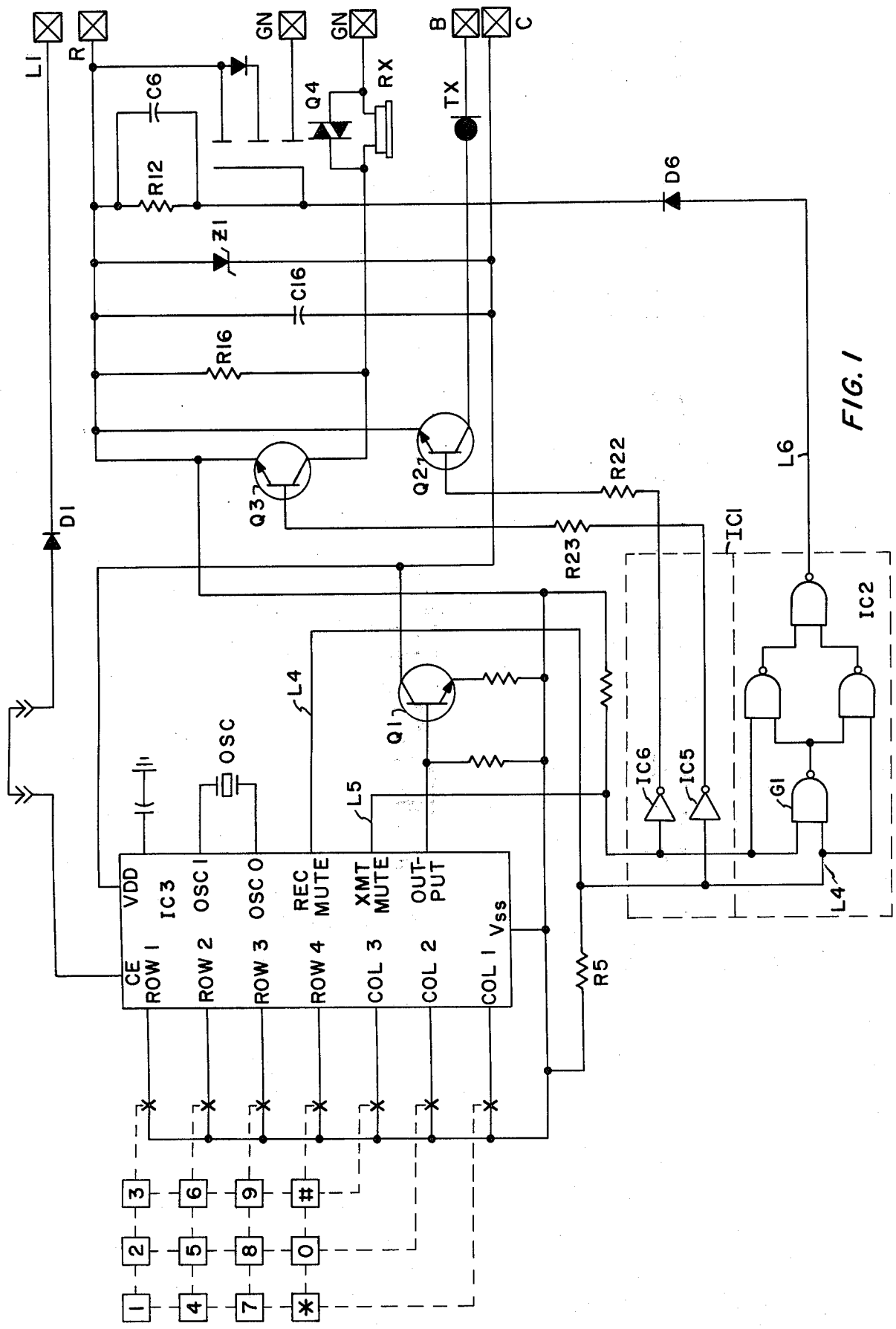
FIG. 1 is a schematic circuit diagram of the invention.

In the circuit diagram of FIG. 1, there is shown a conventional twelve digit key block which may be of the type well-known and generally used in Touch Tone telephones of the Bell System. Any other suitable push button key block of this type may be used. As is well-known, the buttons of the block are arranged in a matrix of columns and rows, each vertical column and each horizontal row having a separate lead directed to a marked input to the tone generator, the generator being labeled IC3.

As is well-known, the tone generator will generate a first specific dialing tone for the column of a depressed button and a second tone responsive to the row of the depressed button. The tone generating function of the generator is conventionally based on a suitable oscillator (OSC) connected to the generator leads OSC-1 and OSC-0. The output terminal of the tone generator is connected to the base of transistor Q1 to transmit the output tone signals to terminal C for transmission to the line through a conventional telephone network.

The muting control within Circuit IC3 may be conventional such as that used on the Digital Tone Generator Model S2859 sold by Americal Microsystems, Inc. This model may be used as the Tone Generator, herein. Various other muting arrangements may be performed by the logic within the generator, as designed and sold by other manufacturers.

Now turning to the muting arrangement as shown in FIG. 1, there is shown connected to the transmit mute terminal of generator IC3 over lead L5 a path to the upper inverter of IC1 and the #1 input of one NAND gate and to one input of an intermediate gate of the exclusive OR gate arrangement of IC2.

The receive mute output terminal of the generator IC3 is connected over lead L4 to the lower inverter input of IC1 and to the #2 input of the input gate and to one input of the other intermediate gate of the exclusive OR gate.

The output of the upper inverter of IC1 is coupled through a resistor R22 to the base of transistor Q2.

Transistor Q2 is normally on to complete a path from the line to the transmitter TX over the transistor collector-emitter path of transistor Q2.

The output of the lower inverter of IC1 is coupled through a resistor R23 to the base of transistor Q3 which has its emitter collector path directed between the line and the receiver RX of the instrument.

The output of the exclusive OR gate is coupled through diode D6 to the parallel RC combination of resistor R12 and capacitor C6 over a lead L6. The lead L6 to the RC combination is also connected to the gate of a VMOS field effect transistor Q4, the source drain path of which shunts the receiver.

In the network of FIG. 1, Zener diode Z1 clamps VDD to VSS to prevent surges which could harm the chips. The resistor R16 acts to control the level of feed back of tones to the ear of the user. The capacitor C16 performs the functions of RF suppression and smoothing out the output tones generated.

To describe the operation of the circuit using the staggered muting approach, the first response of tone generator IC3 to the depression of a button on the key block is an output signal on the receiver mute terminal of IC3. This signal is transmitted over lead L4 to the lower inverter 15 of IC1 and to the lower input of NAND gate G1 of Exclusive OR gate IC2. In response to the signal from inverter 15, transistor Q3 is shut off to provide series muting for the receiver. The exclusive OR gate is turned on to provide shunt muting of short duration for the receiver in addition to the series muting. A charge is built upon capacitor C6 over lead L6 during this shunt muting period.

After a timed interval, a transmit mute signal is emitted on the transmit mute terminal over lead L5 to the upper inverter 16 of IC1 and to the upper input of gate G1 of IC2. The signal through upper inverter 16 causes transistor Q2 to shut off and open a series path from the transmitter TX. Since the receive mute signal continues, transistor Q3 remains off maintaining the series muting of the receiver Rx.

The transmit mute signal is also sent to the lower input of gate G1 of the exclusive OR gate causing the output of the exclusive OR gate IC2 to be shut off. The charge on capacitor C6 slowly drains through resistor R12 slowing the release of the shunt path across the receiver and softening the effect of any noise directed to the receiver RX when the shunt path opens. With the shunt muting effect removed, the tones generated and transmitted on the output lead pass out to terminal C with a minimum shunt loading of the tone signals.

Both the transmit and receive mute signals from generator IC3 continue until the depressed key button is released. At that time, the transmit mute signal from IC3 is shut off. With this signal off (and the receive mute signal continuing), the exclusive OR circuit IC2 again causes transistor Q4 to operate and provide shunt muting for the receiver. This shunt muting occurs after the tone has been sent and during the period when there is a switching between different taps on the hybrid transformer. The transformer switching is very likely to generate inductive spikes to the receiver. Transistor Q2 turns on to remove the series mute path to the transistor thereby enabling the transmitter TX.

After a timed period, the receive mute signal from IC3 is terminated causing the exclusive OR gate output to restore and open the operating path to the gate of transistor Q4. Transistor Q3 is turned on again to remove the series mute. The capacitor C6 discharges to slow the release of the receiver shunt path for a period sufficient to shunt any noise signal and to soften any noises. At the end of the RC period of R12-C6, the transistor Q4 restores to open the receiver shunt path and to enable the receiver for use.

I claim:

1. In a telephone station circuit employing dual tone multifrequency generator means for producing an output comprised of two tones in response to depression of a selected button of a button key pad, and including a transmitter and a receiver coupled to the output of said generator means, said generator means responsive to depression of said selected button for generating a first signal, said generator means operative a time period after said first signal for generating a second signal, the improvement comprising means responsive to said first signal for series muting the coupling to said receiver, further means responsive to said first signal for shunt muting said receiver, means responsive to said second signal for muting said transmitter from the output of said generator means, logic means responsive to said second signal for terminating the shunt muting of said receiver while maintaining the series muting of said receiver coupling.

2. A station circuit as claimed in claim 1 in which said transmitter muting means in responsive to release of depression of said button for terminating said transmitter muting and said logic means is responsive to said release of depression of said button for again shunt muting said receiver for a time period following which the receiver muting ends.

3. A station circuit as claimed in claim 1 in which said logic means includes an exclusive OR gating network.

4. A telephone station circuit employing an integrated circuit dual tone multifrequency generator for producing an output comprised of a combination of two tones in response to depression of a selected one of a plurality buttons, said circuit including an audio signal transmitter and an audiosignal receiver coupled to the output of said generator, the invention comprising means for muting the receiver during the time interval of depression of a button and for a short interval following release of depression of the button, said muting means including first switching means in series with said receiver and second switching means in shunt of said receiver, both said switching means rendered effective on depression of a selected button to mute the receiver, logic means for causing release of said second switching means of a period after the depression of said button, said second switching means rendered effective on the release of said selected button to apply the shunt muting once again to said receiver after release of the depressed button, and said generator operative to release both said first and said second switching means a time interval after release depression of said button with said first switching means having remained effective during the entire interval of depression of said selected button and for said interval thereafter.

5. A station circuit as claimed in claim 4, in which there is a third switching means for series muting said transmitter, and in which said logic means maintains either said second or third switching means effective but not both during the entire interval.

* * * * *